United States Patent [19]

DeMenthon

[11] Patent Number: 4,675,825

[45] Date of Patent: Jun. 23, 1987

[54] COMPUTER-CONTROLLED PERIPHERAL SHAPING SYSTEM

[76] Inventor: Daniel F. DeMenthon, 10399 Green Mountain Cir., Columbia, Md. 21044

[21] Appl. No.: 666,448

[22] Filed: Oct. 30, 1984

[51] Int. Cl.⁴ .......................................... G06F 15/00
[52] U.S. Cl. .................................. 364/474; 83/171; 83/651.1; 219/69 W
[58] Field of Search ............ 364/474, 475; 219/69 W, 219/69 G; 125/21, 16 F, 35; 51/165.71; 83/71, 171, 651.1, 789, 794, 796, 797, 451

[56] References Cited

U.S. PATENT DOCUMENTS

| | | | |
|---|---|---|---|
| 2,646,494 | 7/1953 | Fegan | 83/171 |
| 3,801,089 | 4/1974 | Fukugami | 83/794 |
| 3,884,104 | 5/1975 | Carman | 83/171 |
| 4,015,499 | 4/1977 | Arthaud | 83/651.1 |
| 4,165,663 | 8/1979 | Tsutsui | 83/788 |
| 4,363,948 | 12/1982 | Itoh | 219/69 W |
| 4,393,450 | 7/1983 | Jerard | 364/474 |
| 4,420,671 | 12/1983 | Bonga | 219/69 W |
| 4,431,896 | 2/1984 | Lodetti | 219/69 W |
| 4,453,070 | 6/1984 | Bonga | 219/69 W |
| 4,467,166 | 8/1984 | Gamo | 219/69 W |
| 4,484,502 | 11/1984 | Ebner | 125/21 |
| 4,559,601 | 12/1985 | Kishi | 364/475 |
| 4,565,915 | 1/1986 | Girardin | 219/69 W |

Primary Examiner—Jerry Smith
Assistant Examiner—Allen MacDonald

[57] ABSTRACT

A system is disclosed for cutting shapes from slabs of easily machinable material, such as plastic foam, under computer control. These shaped slabs can then be piled and glued together in order to build large complex volumes, to be used as models, molds or cores of fiber-reinforced objects. The slab of material is rotated around a fixed axis of rotation, while a cutting wire is driven in translation and tilted at various angles within a plane parallel to or containing said axis of rotation. The cutting action of the wire results from electrically induced heat and/or abrasive motions of the wire in its own direction. This cutting machine is used as a peripheral of a microcomputer, and receives from this microcomputer the signals necessary to control the electric motors driving the rotation of the slab of material and the motions of the cutting wire.

13 Claims, 4 Drawing Figures

COMPUTER-CONTROLLED PERIPHERAL SHAPING SYSTEM

BACKGROUND OF THE INVENTION

This invention relates to devices for cutting materials such as slabs of plastic foam by use of a cutting wire.

In the prior art, such as described in U.S. Pat. Nos. 2,646,494 or 3,884,104 devices are presented for cutting patterns in slabs of rigid plastic foam, such as styrofoam. These devices comprise a flat horizontal table and a cutting wire which is maintained perpendicular to the table and under tension between an attachement point under the table level and an attachement point on a beam extending over the table. The wire is heated by an electric current, and the operator can cut a shape out of a styrofoam slab by manually sliding and driving the slab on the table, and visually controlling the path of the heated wire into the slab. to obtain more precise shapes, the operator must fix a template at the desired shape on one face of the slab and slide the slab on the flat table while making sure that the wire is maintained in contact with the edge of the template and cuts its way around the template. Large volumes can be obtained by piling a number of styrofoam shapes obtained from the device, but to achieve a volume with a smooth surface this technique requires extensive cutting and sanding to eliminate the steps resulting on the surface of the volume from each slab, because the heated wire could not be tilted to appropriate angles tangent to the desired surface during the cutting of the slabs. Thus the final desired volume can be obtained from the stepped volume only by extensive sanding.

For this reason, in the creation of large volumes, the alternative approach of using only a hand-held heated wire maintained in tension by a bow-like frame is still most often preferred. In the surfboard, windsurfing and model-making industries, shapers have been using such a type of hand-held tool for directly sculpting the desired shapes and volumes from large blocks of plastic foam. The results are checked during the operation by repeated applications of control templates at the surface of the foam volume. A large percentage of the original foam block is usually wasted. The final approach to the desired shape relies on extensive sanding and filling. In an alternative method also making use of a hand-held heated wire, but applying the slice-by-slice building of a large volume and the use of commercial slabs of plastic foam, templates are pinned to both faces of the plastic foam slab, and the heated wire is manually driven along both templates. The process is repeated for each slice element of the volume, and the slices are then glued together to compose the whole volume. The obtained volume is much closer to the final desired volume than by use of the cutting device described by U.S. Pat. Nos. 2,646,494 or 3,884,104; but it is a tedious and complex task to define and cut all the templates and it is difficult to coordinate by hand the travel of the cutting wire along both templates at a uniform rate.

Therefore the main object of the present invention is to mechanize these manual techniques in order to make them more precise and less time-consuming to operators in the model-making, mold-making, aeronautical or watercraft industries. The resulting device is related to the devices of the prior art described in the beginning of this paragraph, in the sense that slabs of plastic foam are moved in the plane of one of their faces while being cut by a wire stretched between a point under this plane and a point on a structure extending over said plane. However this invention extends this technique far beyond its previous limitations, by allowing an automatic rotation of the plastic foam, as well as an automatic translation and tilting of the cutting wire, these motions being calculated and monitored by a microcomputer from the drawings made on the screen of this microcomputer. In this sense, the present invention also relates to computer-controlled cutting machines such as presented in U.S. Pat. No. 4,393,450, which describes a lathe-type arrangement for generating 3-D models out of plastic foam, wherein a cutting wire perpendicular to the axis of rotation of the plastic foam is mounted on the head stock of the lathe. However, the divergences of objectives of this invention with respect to this prior art result in specific mechanical and kinematic features, as well as distinctive advantages. The present invention is aimed at cutting and shaping single slabs as elements of large volumes and therefore provides the means for creating volumes which are very large compared to the size of the machine. The specific kinematics of the cutting wire in this invention, combined with the technique of building volumes out of slabs, enable the operator of the present device to create volumes with concavities which could not be obtained by the system described in U.S. Pat. No. 4,393,450, because the frame parts holding the wire ends in that system would hit the plastic foam in an attempt to cut such concavities.

SUMMARY OF THE INVENTION

The general object of the invention is to provide a device specifically designed to cut shapes in commercial slabs of plastic foam.

More specifically, an object of the invention is to provide a device able to cut various shapes from slabs of plastic foam, in which such slabs are mechanically rotated and severed under the action of a cutting wire which can be mechanically tilted and translated.

Another object is to provide a device able to cut a series of shapes from plastic foam slabs in such a fashion that these different shapes can be piled up and glued together to constitute complex volumes with very little further sanding or filling, for model-making, mold-making, aeronautical or water-sport applications.

Another object of the invention is to provide an automatic device for cutting series of plastic foam slabs, in which a microcomputer monitors at the same time through electronic interfaces the speed and direction of rotation of the plastic foam slab, the speed and direction of translation of a cutting wire, the angular position of this wire with the axis of rotation of the plastic foam slab, and, in some embodiments, the tension and alternated cutting motion of the cutting wire, and the heat of this wire. Another object is to provide a device which can be used as a peripheral of a microcomputer, in such a fashion that the operator can draw several views of the desired total volume on the screen of said microcomputer, and that a computer code can deduce the amount and shapes of slabs needed as slice elements for the creation of the whole volume, and can send to the device according to the invention the appropriate signals needed by the motors driving the motions of the cutting wire and the rotation of the slabs of plastic foam in order to cut the appropriate shapes out of said slabs.

A further object of the invention is to overcome the disadvantages of the prior art, therefore to enable the automatic creation of very large volumes of plastic foam with a machine of small dimensions, and to provide the means for closely approximating concavities in said large volumes.

According to the invention, the slab of plastic foam is rotated by an electric motor around an axis perpendicular to the parallel faces of the slab, and a cutting wire is translated and tilted by two electric motors while staying in the plane of the axis of rotation or in a plane parallel to this axis. The cutting action is created by the heating of the wire and/or the abrasive motion of the wire in its own direction. For the purpose of clarifying the kinematics of a machine according to the invention, some examples of the required combined motions of the slab and the wire needed to cut specific shapes are now given:

If a right circular cylinder is desired, the cutting wire is neither translated nor tilted. but is maintained at a fixed position parallel to the axis of rotation. As the plastic foam slab rotates, the cutting wire makes a cylindrical cut in the plastic foam. If the slice of plastic foam needs to be a right elliptic cylinder instead of a right circular cylinder, the cutting wire need not tilt, but instead is translated closer to the axis of rotation in some parts of the foam rotation and further in other parts, moving within a plane which contains the axis of rotation while remaining parallel to the axis of rotation.

Now, if a cone of revolution is desired, the wire need not be translated, but must be kept tilted at an angle with respect to the axis of rotation as the foam slab is rotated. Finally, in most required cases, in which the piece cut from the plastic foam slab is intended to be a slice element of a larger volume obtained by assembling several slices, the required piece of plastic foam is neither a cylinder nor a cone, but a more complex shape, for which the cutting wire needs to be both translated and tilted in a plane containing the axis of rotation while the foam slab is rotated. It can be understood from the previous examples that in this invention, these contour lines of the final desired volume (volume obtained by piling up and gluing a certain amount of slabs shaped by the present device) which are located in planes parallel to the faces of the plastic foam slab can be obtained smoothly from the combined revolutions of the slab as well as linear and angular displacements of the wire, and can also be concave in places. On the other hand, these surface lines of the final desired volume composed of segments which are in the direction of the cutting wire when the wire makes these segments cannot be made totally smooth on the surface of the final volume. These overall longitudinal lines will be called critical lines. If for instance the final desired volume is made out of ten slices, each slice contains a piece of every critical line. These pieces of lines can be interpreted as straight segments only in the areas where the curvature (convex or concave) of the considered critical line is small. The corresponding slices can then be cut out of a foam slab by a single cut of the wire at an appropriate angle and by a single rotation of the slab. If however, the curvatures of the critical lines are large and convex in the slab being cut, these portions of critical lines cannot be approximated as segments, but can be approached by successive cuttings of the wire at different positions tangent to the critical lines during successive rotations of the slab. If the curvatures of the critical lines are large and concave in certain areas of the volume, it is still possible to generate such volumes by using thinner slabs in these areas, so that the portions of critical lines in these thinner slabs can still be approximated as straight segments.

All these features and other advantages will become more apparent from a complete reading of the following description of specific embodiments of the invention, in connection with the accompanying drawing.

DETAILED DESCRIPTION OF THE DRAWING

Figure 1:
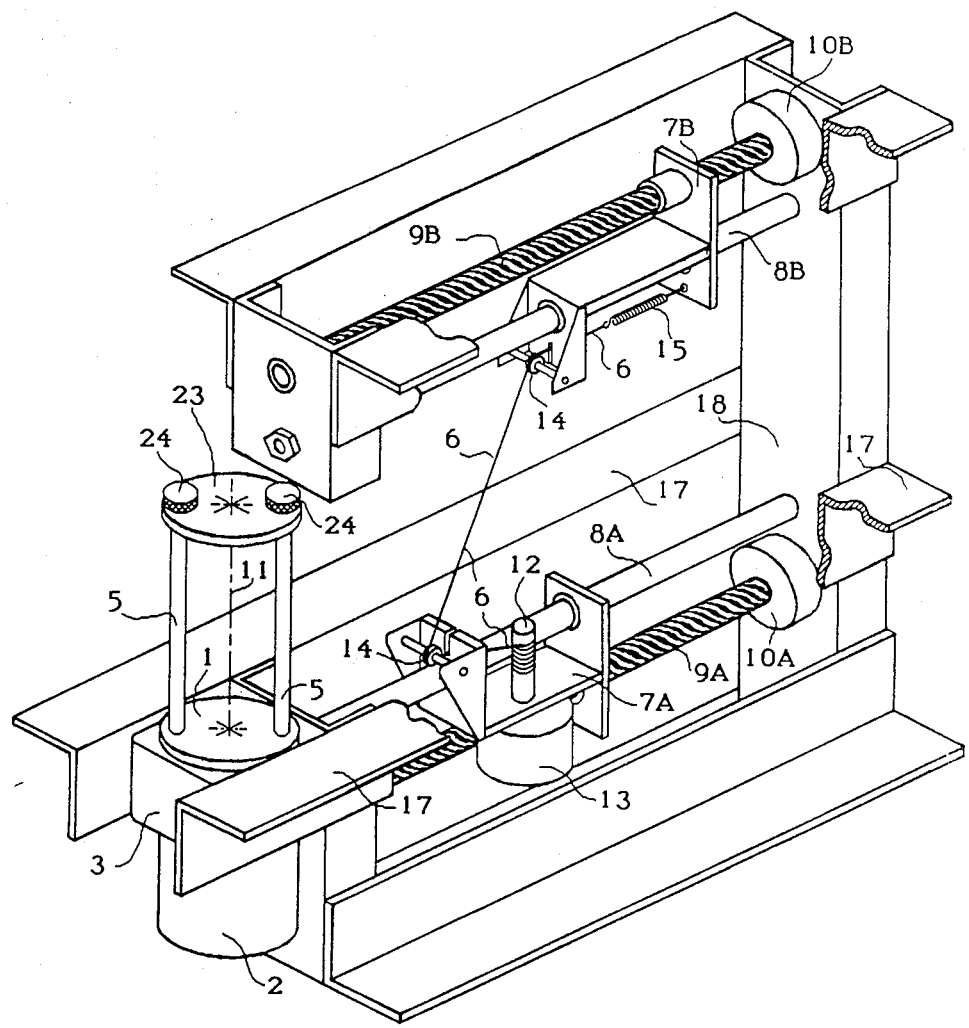
FIG. 1 is a perspective view of an embodiment of a shaping machine according to the present invention, with portions of angle members broken away and no workpiece shown.
Figure 2:
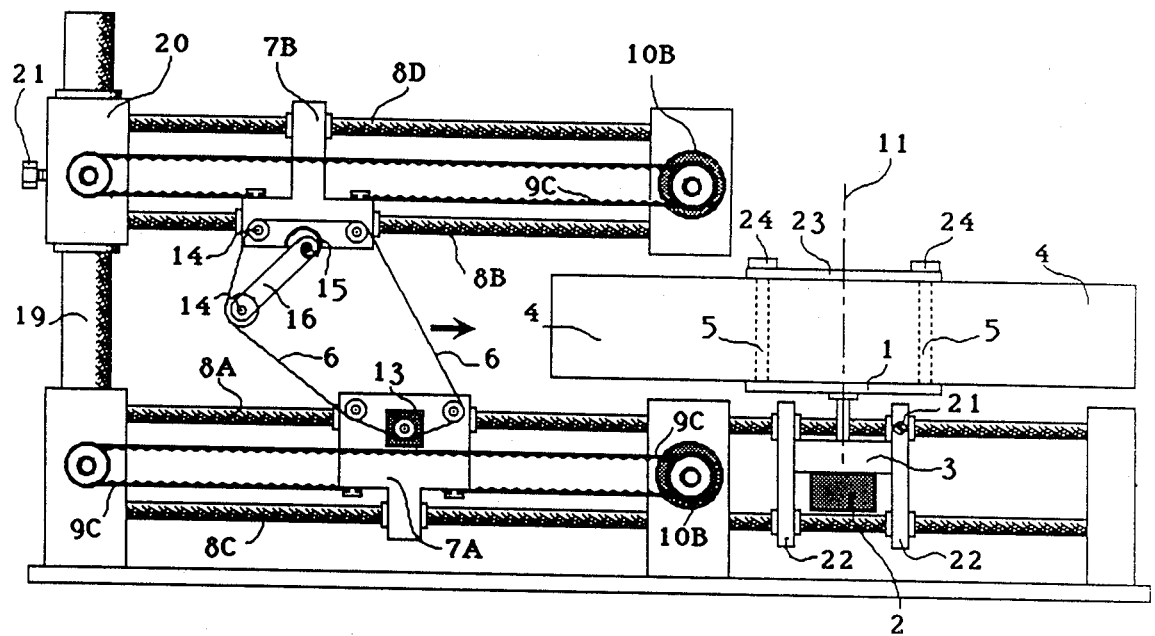
FIG. 2 is a side view of a modified version of the foam-cutting machine, showing a slab of workpiece.

As shown in FIG. 1 and FIG. 2 the system includes a turntable 1 controlled in rotation by an electric motor 2 whose speed is optionally reduced by a gear-box 3. The turntable can drive in rotation a large slab of styrofoam 4 shown only in FIG. 2. Such a slab can be positioned on the turntable by various means, as for example a pair of spindles 5 fitting in holes made in the foam slab 4. The slab 4 can be held down by an upper plate 23 slid on the spindles 5 and by thumb screws 24 retained in threaded upper bores in spindles 5.

Figure 4:
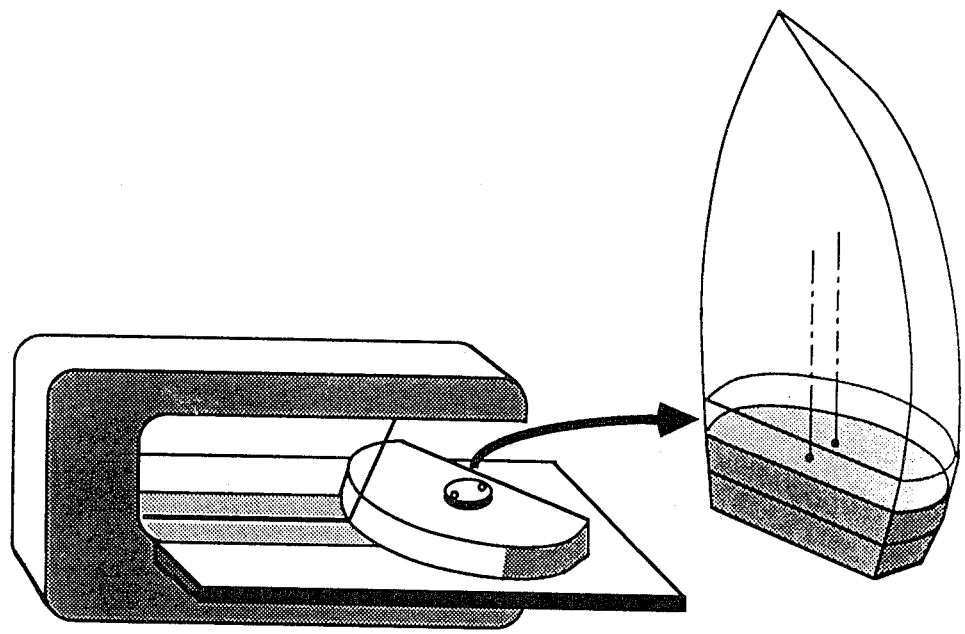
FIG. 4 shows a boat model which can be assembled from slabs shaped by the disclosed shaping system.

The holes made in the foam slabs for their positioning on the turntable can be used afterwards to precisely align and fasten together different elements of foam cut by the machine in order to compose a large volume, such as the boat model represented in FIG. 4 as a piling of shaped slabs. Horizontally disposed angle members 17 having flat upper flanges at the level of the turntable extend the support of the turntable and provide flat smooth surfaces on which large slabs are allowed to slide when rotating and are prevented to sag.

As a foam slab is rotated on the turntable 1, a cutting wire 6 is driven into the foam by the two carriages 7A and 7B controlling the position and angle of the cutting wire while they slide on rails 8A and 8B to which additional guiding means such as rods 8C and 8D shown in FIG. 2 can be adjoined. In FIG. 1 the carriages controlling the wire ends are shown to be driven in translation by lead screws 9A and 9B rotated by motors 10A and 10B, but alternate means, such as the belts 9C or 9D, connected to the carriages 7A and 7B as represented in FIG. 2, can also be used for transforming the rotation of the motors 10A and 10B into the translations of the carriages.

When heat is used as a cutting agent, the wire 6 may be made of a high resistance alloy such as a nickel-chrome alloy, and heated by an electric current. When abrasion is used as a cutting agent in addition or in replacement to the heating action, the cutting wire may be a thin cable of uneven abrasive surface composed of several twisted wires. A motor 13 is then used to generate the motion of the cutting wire. In the embodiment shown in FIG. 1, a periodic electric excitation is given to the motor 13, resulting in a periodic torque on the spool 12 on which one end of the wire 6 is wound, in a periodic response of the spring 15 attached at the other end of the wire, and in a reciprocating motion of the cutting wire 6. In the embodiment shown in FIG. 2, the motor 13 is given a continuous excitation, and drives the cutting wire in a continuous motion by means of the spool or pulley 12. In both Figures, changes of direction of the wire are effected by pulleys 14, which can be made conductive at each end of the cutting segment of wire in order to transmit an electric heating current to this cutting segment.

The two carriages 7A and 7B are given dissimilar translations, in order to tilt the cutting wire 6 at various angles with respect to the axis of rotation 11 of the foam slab. A variable distance between the two carriages results from this process, and the length of the straight segment of wire in tension between the carriages must be allowed to vary. In the embodiment of FIG. 1, when the carriages 7A and 7B move apart they exert on the wire 6 a force which counteracts the pulling tension of the electric motor 13 and spring 15, and unwinds the needed amount of wire from the spool 12. When the carriages 7A and 7B have to move closer to each others, the electric motor 13 rewinds some wire. Passive elastic devices such as the linear spring 15 of FIG. 1 may also be used alone and without the motor 13 when heating is the only cutting agent. In the embodiment of FIG. 2, the tension in the wire loop is maintained in the various relative motions of the two carriages 7A and 7B by the action of a spiral spring 15 on an arm 16 pushing one of the idle pulleys 14 against the wire.

In order to accomodate various thicknesses of plastic foam slabs, the entire mechanical structure supporting and displacing the upper carriage 7B—composed of the rail 8B, the motor driving the carriage 7B in translation, and means 9 to transmit the motor motion to the carriage 7B—can be mounted by bolts and nuts on various predrilled holes at various heights on the vertical post 18 shown in FIG. 1. An alternate solution allowing faster adjustments of the position of this mechanical structure is shown in FIG. 2. The vertical post 18 is replaced by a column 19, and all the attachements of the said structure which were done directly on the post 18 in the previous solution are effected on this solution on a sleeve 20 which can be slided at various positions on the column 19. The sleeve 20 can then be blocked at any desired position by a mechanism such as for instance a set screw 21 mounted through the sleeve 20.

Similarly, in order to accomodate very large dimensions of foam slabs, the mechanical structure composed of the turntable 1, the motor 2, and the gearbox 3, may be mounted on a carriage 22 able to slide on horizontal rails, such as extensions of the rails 7A and 8C guiding the cutting wire carriage 7A. By sliding the cariage 22, the turntable 1 and the axis of rotation 11 of the slabs can be placed further away from the vertical post 18 or from the vertical column 19. The manual adjustments of the positions of the carriages 20 and 22 are intended to increase the range of foam slab dimensions which can be shaped by a given machine. They can also allow one to displace the overhanging rails 7B out of the way when positioning a foam slab on the spindles of the turntable and to facilitate this operation.

Figure 3:
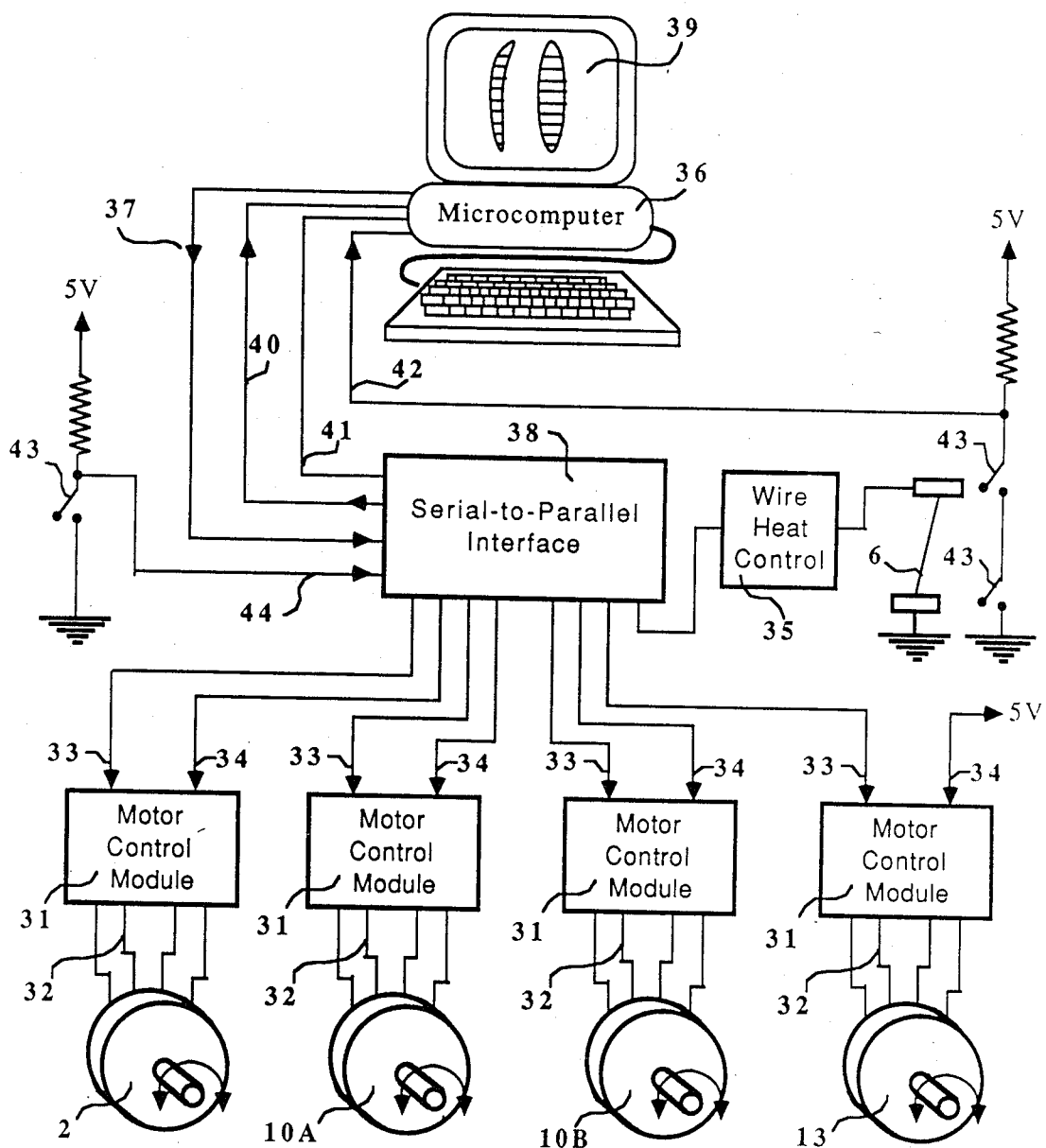
FIG. 3 is a schematic diagram which shows the main electrical connections and electronic blocks needed for interfacing a microcomputer and the electric motors driving the cutting wire and the workpiece.

In a preferred embodiment of the invention, the foam-cutting machine of the invention is controlled by a microcomputer in a way which is schematically represented in the diagram of FIG. 3. The four electric motors 2, 10A, 10B and 13 which perform the rotation of the foam slab, the translation of the two carriages, and the wire cutting motion and/or tension, are in a preferred embodiment stepping motors. This well-known type of motor rotates with a precise and constant small angle or "step" each time an appropriate train of impulses is sent to its windings through excitation lines 32. Such a train of impulses is generated by a special electronic control module symbolized by a box 31 in FIG. 3, every time the module receives a step command impulse signal through step control line 33. These modules apply well-known electronic conversions of the logic signals. A direction signal is also required to be sent through direction control line 34 to each control module, low or high according to the direction of rotation needed from the corresponding motor. For the motor 13 generating the wire cutting motion and/or tension, the torque is always applied in the same direction, and therefore the direction signal can be set constant, for instance at 5 V. The three other motors, however, need both a specific direction signal sent through line 34 and a step command signal through line 33, so that both the speed and the direction of the foam rotation and carriage translations be controlled. The whole system thus requires seven signals for the control of the four motors, and an eight impulse signal can be used for the heat control of the wire 6 and amplified through a module symbolized by the box 35 in FIG. 3. These eight signals can be eight bits sent by a microcomputer 36 through one of its output ports, either through eight parallel lines, either in a serial fashion through a standard serial data line 37, as represented in FIG. 3; in this latter case a serial-to-parallel interface 38 is needed to separate the eight bits within the serial signal and dispatch these eight bits toward their respective control modules 31. At least three other lines are usually adjoined to the serial data line 37 in a standard serial communication cable, and are represented in FIG. 3. These are a data line 40 to send data back to the computer, a ground line 41 which links the ground of the computer and the ground of the interface 38, and a "Busy" line 42, which can be used to command the suspension of the data flow through line 37, for instance when some switches 43 are activated by the carriages at the end of their course or by the turntable at specific angles of rotation. Such switches, used for checking the positions of the turntable and carriages, can, as an alternative also shown in FIG. 3, switch the voltage of parallel lines 44, and the pattern of voltages of these parallel lines can be transformed into a.serial form by the serial-to-parallel interface and sent to the computer through the data line 40 in order to inform the computer of the positions of these switches.

The volume to be cut can be specified to the microcomputer through various means, such as a digitizing system, several views of the volume drawn on the screen 39 of the computer, mathematical equations of the volume, lists of coordinates of points at the surface of the volume, etc. . . . A computer program transforms these informations into the proper trains of eight bit groups to be sent to the foam-cutting machine in order to command the cutting wire and each of the required slabs of material into the motions required for shaping adequate elements of the specified volume. This technique of obtaining large volumes by piling up slabs being shaped by the computer-controlled machine according to the invention is illustrated in FIG. 4.

A new group of bits is sent every fraction of second; in each group the bit controlling the steps of a specific motor is either a high or a low voltage level according to whether a stepping of this motor is required at this given instant, and the bit controlling the rotation of this motor is either a high or a low voltage level according to whether a clockwise or counterclockwise rotation is needed at this given instant. For the heat control of the cutting wire, a higher frequency of occurences of high voltage levels in the specific control bit will result in a higher average current.

When the cutting wire is tilted, the heated length of wire becomes longer and requires a higher average current and therefore a higher frequency of occurrence of a high voltage level to achieve the same local temperature. Similarly, for the control of the wire tension in the embodiment represented in FIG. 1, the average tension will depend on the frequency of occurrence of a high level for the bit controlling the steps of the wire control motor. This tension pulsates at the frequency of occurrence of a high level bit, and gives a longitudinal motion to the cutting wire which is used as a cutting mechanism in replacement or in addition to the heating action provided a wire with a rough surface, such as a thin cable, is chosen. For this purpose, the amplitude of the longitudinal vibration of the utting wire can be increased by decreasing the strength, or increasing the length of the elastic element 15 to which the end of the cutting wire is attached.

Although described as being useful for the model-making, mold-making, aeronautical or watercraft industries, this disclosure does not limit the invention for these sole intended uses, since it is believed that there may be numerous other fields of use of this invention.

As will be apparent to one skilled in the art, numerous modifications and variations of the invention, in addition to those recited above, may be easily made, without departing from the spirt and scope of the invention.

What is claimed is:

1. A turning machine for shaping a slab of easily machinable material having at least two parallel faces, said machine comprising:
    power means for rotating the slab about an axis perpendicular to said parallel faces;
    a cutting wire comprising a straight segment which operationnaly contacts the slab and extends through and beyond both said parallel faces; and
    power means for independently translating the ends of said straight segment towards and away from the axis of rotation in order to selectively vary the spacing and angle of said straight segment with respect to the axis of rotation.

2. A turning machine according to claim 1 in which the cutting wire is heated by passage of an electric current therethrough, such that its cutting action is due at least partially to local melting of the slab material in contact therewith.

3. A turning machine according to claim 1 in which the cutting wire has an abrasive surface and further means are provided for moving the cutting wire in its own direction under tension, either continuously or reciprocally.

4. A turning machine according to claim 1 in which the means for rotating the slab includes a turntable, a motor driving said turntable, and means to fasten said slab to said turntable.

5. A turning machine according to claim 4 in which the axis of said turntable is vertical and smooth flat support surfaces are disposed beyond the turntable and are flush therewith, so as to slidably support marginal portions of the slab which normally extend beyond the turntable.

6. A turning machine according to claim 1 in which the means for independently translating the ends of said straight segment comprise slidable carriages movable on parallel rails, between which the portion of the slab being cut moves.

7. A turning machine according to claim 6 in which means are provided to modify the distance between the rails, so as to accomodate slabs of different thicknesses.

8. A turning machine according to claim 6 in which one or both of the carriages carry means for taking up the slack in the cutting wire so as to maintain the tension in said straight segment.

9. a turning machine according to claim 6 in which the axes of the parallel rails are horizontal and disposed in a vertical plane, the carriage on the lower rail is diposed below two elongated members parallel thereto and between which said straight segment of the cutting wire passes, and smooth surfaces on said elongated members are in the same horizontal plane so as to provide sliding support for outboard portions of the revolving slab alongside the cutting site.

10. A turning machine for shaping a slab of easily machinable material having at least one set of two parallel faces comprising:
    a turntable upon which the slab is secured during operation, the parallel faces of said set being mounted perpendicular to the central axis of the turntable and normally extend beyond the turntable;
    a motor for revolving the turntable about the central axis;
    two carriages operationnally flanking said set of parallel faces of the slab and mounted for independent translations toward and away from said central axis;
    means including further separate motors to effect said carriage translations;
    a cutting wire comprising a straight segment extending between said carriages for operational engagement with the slab; and
    means for taking up slack in the cutting wire to maintain said straight section under tension.

11. A turning machine according to claim 10 in which a microcomputer selectively controls the electric currents activating the turntable and carriage motors, by means of electronic interfaces transforming the signals sent by said microcomputer into electric currents appropriate for said motors.

12. A turning machine according to claim 11 in which stepping motors are used, which turn with precise and constant increments under the action of specific trains of electric impulses, and said microcomputer controls each of these motors by sending at short intervals to said electronic interfaces trains of signals composed of high or low voltage impulses according to whether a rotation or no rotation is desired and to whether a clockwise or counterclockwise rotation is desired for the corresponding motors in the considered time intervals.

13. A turning machine according to claim 12 in which said microcomputer uses computer-aided design software to permit facile translation of computer-aided design shapes to complex three-dimensional models.

* * * * *